US005767739A

United States Patent [19]

Witte

[11] Patent Number: 5,767,739

[45] Date of Patent: Jun. 16, 1998

[54] DIGITAL DEMODULATOR FOR QUADRATURE AMPLITUDE AND PHASE MODULATED SIGNALS

[75] Inventor: Franz-Otto Witte, Emmendingen, Germany

[73] Assignee: Deutsche ITT Industries GmbH, Freiburg, Germany

[21] Appl. No.: 792,924

[22] Filed: Jan. 21, 1997

[30] Foreign Application Priority Data

Jan. 26, 1996 [EP] European Pat. Off. .............. 96101105

[51] Int. Cl.$^6$ ........................................ H04L 27/38

[52] U.S. Cl. .......................... 329/306; 375/261; 375/324

[58] Field of Search .................................... 329/304, 306, 329/307, 308, 309, 310; 375/261, 324, 340, 328

[56] References Cited

U.S. PATENT DOCUMENTS 5,497,400 3/1996 Carson et al. .......................... 375/324

*Primary Examiner*—Siegfried H. Grimm
*Attorney, Agent, or Firm*—Plevy & Associates

[57] ABSTRACT

Digital demodulator for a quadrature-modulated signal (sq) which transmits a combination signal by amplitude and phase modulation. A quadrature-signal source provides a digitized in-phase component (I) and a digitized quadrature component (Q) of low frequency. A resolver converts the two components (I,Q) into a magnitude signal (b) and a first phase signal (p1). A first feedback control loop and a second feedback control loop that maintains the slope (mp) of the first phase signal (p1) at the zero value and the time average (pm1) at the zero phase position, whereby a third phase signal (p3) is formed. From the resulting signals (b, p3, p3') a decoder forms at least one of the required components (R,L,P).

20 Claims, 2 Drawing Sheets

$$\varphi = \arctan \frac{D}{1+S}$$

$$M(t) = \mathrm{Re}\left\{(1+S) \cdot e^{\,j(\omega t + \varphi)}\right\}$$

DIGITAL DEMODULATOR FOR QUADRATURE AMPLITUDE AND PHASE MODULATED SIGNALS

BACKGROUND OF THE INVENTION

1. Field of the Invention

The present invention relates generally to demodulators, and more particularly to a digital demodulator for a quadrature-modulated signal which transmits a combination signal by amplitude and phase modulation.

2. Description of the Prior Art

Quadrature-modulated signals are used for signals which belong together but are independent of each other and have to be transmitted in one transmission channel. Such applications include the transmission of stereo signals according to the C-QUAM standard, where a sum signal is transmitted by amplitude-modulating the respective carrier, while a difference signal and a pilot tone are transmitted by phase-modulating the carrier. An example of a digital demodulator for such signals is described in Published Patent Application DE 43 40 012 A1.

The above patent discloses a quadrature-signal source that forms an in-phase component and a quadrature component from the received quadrature-modulated signal by means of a quadrature mixer. Digitization may take place ahead of or after the quadrature mixer. By means of a resolver which preferably uses the Cordic algorithm, the digitized in-phase component and the digitized quadrature component are transformed into a magnitude signal and a phase signal. A feedback control system controlled by the phase signal maintains the oscillator frequency of the quadrature mixer exactly at the value of the carrier frequency, so that the in-phase component and the quadrature component are transformed into the baseband. To correct a residual mean phase deviation, the feedback control system also acts on the phase signal by adding or subtracting a correction signal which pulls the time average of the phase signal to the zero phase value. A decoder, which comprises essentially a known stereo matrix, produces the required left and right signals and the 25-Hz pilot signal from the magnitude signal and the phase signal.

It is therefore, an object of the present invention to provide an improved digital demodulator for such quadrature-modulated signals which are better adapted to digital signal processing and places less stringent requirements on the quadrature-signal source.

SUMMARY OF THE INVENTION

A method and apparatus is disclosed for digitally demodulating a quadrature-modulated signal which transmits a combination signal by amplitude and phase modulation. A quadrature-signal source is included, which in response to the received quadrature-modulated signal (sq), provides a digitized in-phase component (I) and a digitized quadrature component (Q) at a low frequency. A resolver which converts the digitized in-phase component (I) and the digitized quadrature component (Q) into a magnitude signal (b) and a first phase signal (p1). Also included is a first feedback control loop following the resolver which, on a time average, maintains the slope of the first phase signal (p1) at the zero value or a residual value, thus forming a second phase signal (p2). A second feedback control loop following the resolver maintains the time average of the second phase signal (p2) at a phase reference value, particularly at a zero phase value, thus forming a third phase signal (p3). A decoder which produces at least one digitized component (R,L,P) of the combination signal from the magnitude signal (b) and the third phase signal (p3).

BRIEF DESCRIPTION OF THE DRAWING

The above objects, further features and advantages of the present invention are described in detail below in conjunction with the drawings, of which.

DETAILED DESCRIPTION OF THE DRAWING

Figure 1:
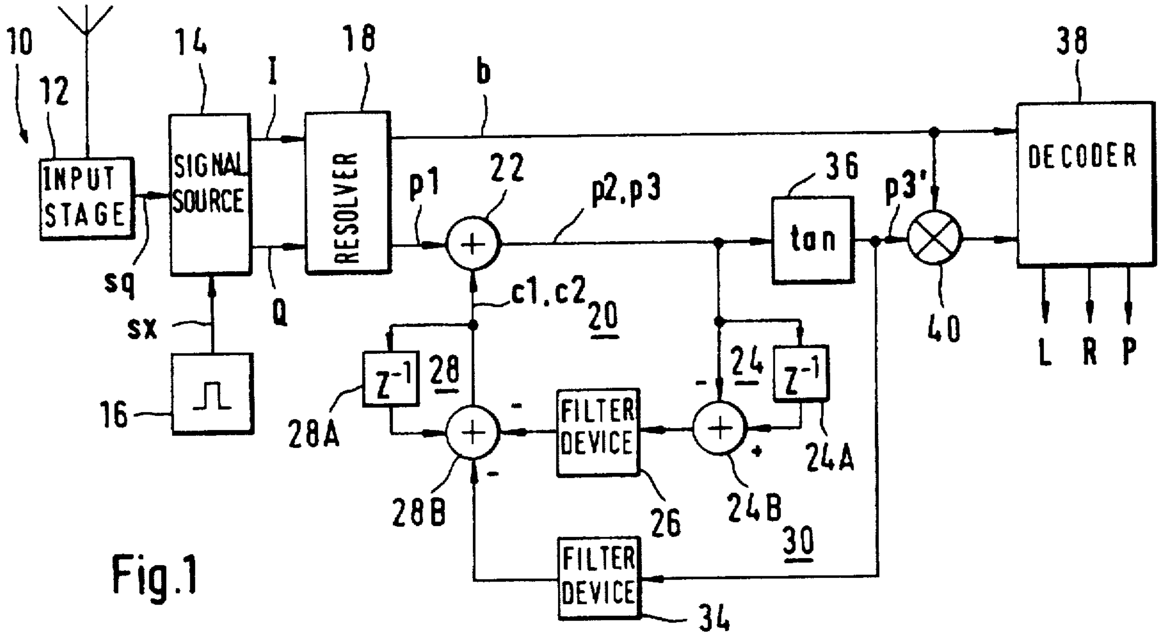
FIG. 1 is a block diagram of a digital demodulator according to the present invention.

The present invention is directed to an improved digital demodulator for such quadrature-modulated signals which are better adapted to digital signal processing and places less stringent requirements on the quadrature-signal source. The essential advantage of this arrangement is that the outputs of the quadrature-signal source, i.e., the digitized in-phase component and the digitized quadrature component, are not required to be exactly at the baseband, but only have to lie in a relatively low frequency range. The bandwidth of this low frequency range depends on the digitization frequency and should not be greater than one tenth of the digitization frequency. These favorable boundary conditions make it possible to implement a digital quadrature mixer with digital switches in a simple manner because the quadrature-modulated digital signal only has to be multiplied by the values +1, −1, and 0. An exact transformation of the quadrature-modulated digital signal into the baseband would require an exact frequency adaptation of the digital mixer signal, which could only be implemented with two costly and complicated digital multipliers via a highly complex sine and/or cosine table. An analog implementation of the quadrature mixer with subsequent digitization of the quadrature mixer with subsequent digitization of the in-phase and quadrature components is also possible, of course, in which case, according to the invention, the oscillator frequency need not be readjusted and is therefore uncritical with respect to drift. The invention thus eliminates the need for phase-locked tracking of the quadrature mixer, complex sine/cosine tables, and complicated multipliers in the quadrature-mixing process.

The first feedback control loop is advantageously controlled via the slope of the first phase signal, which is obtained by forming the difference between at least two temporarily adjacent values. This, of course, includes the possibility of using further sample values for the formation of the difference in order to achieve better averaging and improve the suppression of disturbance variables.

To achieve high control accuracy, it is advantageous if the feedback control loops include an integrator. Especially suited for this purpose are accumulator loops with sufficient bit capacity, so that no overflow will occur in the normal mode of operation.

Advantageously, the corrective signal of the first and/or second feedback control loop is so constituted that it can be combined as an additive or subtractive correction signal with the respective phase signal via an adder. If the two feedback control loops are of a suitable design, the two corrective signals may be additively combined, so that only a single adder is required for correction in the phase-signal path. In a similar manner, the integrators for the first and second feedback control loops may be combined by feeding the two corrective signals to the adder in the accumulator circuit. The output of the latter then provides the common corrective signal.

For the respective transmission standard it may be necessary to modify the third phase signal ahead of the decoder by means of a modification device. The modification device corresponds to a predetermined signal characteristic which is inverse to the signal characteristic at the transmitting end. The modification device may have a nonlinear characteristic; and C-QUAM standard, for example, specifies a tangent characteristic as the characteristic at the receiving end. The tangent characteristic may be defined by a memory table or by a polynomial approximation, as in the above-mentioned DE 43 40 012.

Referring to FIG. 1, there is shown a block diagram of a digital demodulator according to the present invention. The demodulator 10 includes an input stage 12 that receives a quadrature-modulated signal sq from an antenna, a cable, or some other device. A quadrature-signal source 14 having an oscillator 16 connected thereto, which provides a digital signal sx of a predetermined frequency fx. The signal source 14 forms an in-phase component I and a quadrature component Q from the quadrature-modulated signal sq, wherein the two components I and Q are digitized. The digitization may take place in the quadrature-signal source 14 or already in the input stage 12.

For a better understanding of the C-QUAM stereo transmission method, some short explanations will be given in the following with reference to FIG. 4. The abbreviation C-QUAM stands for "compatible quadrature amplitude modulation", an AM stereo transmission method which was developed by Motorola and is being used particularly in the USA and Australia. As in nearly all stereo standards, a sum signal S and a difference signal D are first formed from the left and right information L and R:

$$S=L+R \text{ and } D=L-R \quad (1)$$

The modulated signal is obtained from the real part (=Re) and the imaginary part of the complex vector M(t) which rotates in accordance with the carrier frequency f at the rotational frequency ω. The magnitude of this vector is to have the value 1+S, with the value 1 representing the carrier, which is assumed to be constant. The magnitude of the difference signal D influences exclusively the phase position of the vector M(t). The phase angle ϕ of the modulation vector M(t) is given by $$\phi=\arctan(D/(1+S)) \quad (2)$$

The C-QUAM signal normalized to the carrier amplitude can thus be expressed as $$M(t)=Re\{(1+S)\,\mathrm{Exp}(j\times(\omega t+\phi))\} \quad (3)$$

The difference signal D is modulated by a 25 Hz pilot tone P at 5% modulation, which permits stereo detection and, thus, automatic stereo changeover.

In FIG. 1, the quadrature-signal source 14 is followed by a resolver 18 which changes the in-phase component I and the quadrature component Q into a magnitude signal b and a first phase signal p1. The resolver 18 produces a transformation from Cartesian to polar coordinates. Especially suited for this transformation is the well-known Cordic algorithm, which determines the required values with arbitrary accuracy via an iterative approximation.

As mentioned above, it is not necessary for the outputs of the quadrature-signal source 14 to be exactly at baseband. If the in-phase component I and the quadrature component Q are sampled at a rate of 19 kHz, it is sufficient for the demodulation according to the present invention of the residual rotational frequency $\omega_r$ of the complex vector M(t) remains less than 2 kHz.

The difference between the oscillator-signal frequency fx and the carrier frequency f gives a residual frequency fr, and thus a residual rotational frequency $\omega_r$ of the complex vector M(t). As a result, the first phase signal p1 is not constant, but increases or decreases on a time average, see also FIG. 2. This corresponds to a constant offset frequency $\omega_r$, which is brought to the zero value by means of a first feedback loop 20 as the mean slope mt of the first phase signal p1 is compensated for by means of a first corrective signal c1 with an equal negative slope. The corrective signal c1 is added to the first phase signal p1 by means of a first adder 22 to form a second phase signal p2, see also FIG. 3.

In FIG. 1, the slope is formed by a difference device 24 from two successive sample values, which are then weighted and/or averaged by means of a first filter device 26. The output of the first filter device 26 is integrated by means of an integrator 28, whose output provides the first corrective signal c1 to the first adder 22. The difference device 24 preferably includes a first delay element 24A and a subtractor 24B. The integrator 28 is preferably formed by an accumulator loop with a second adder 28B and a second delay element 28A. The outputs of the two feedback control loops 20, 30 are applied to the second adder 28B as inverted signals to ensure that the control direction at the first adder 22 is right.

Figure 3:
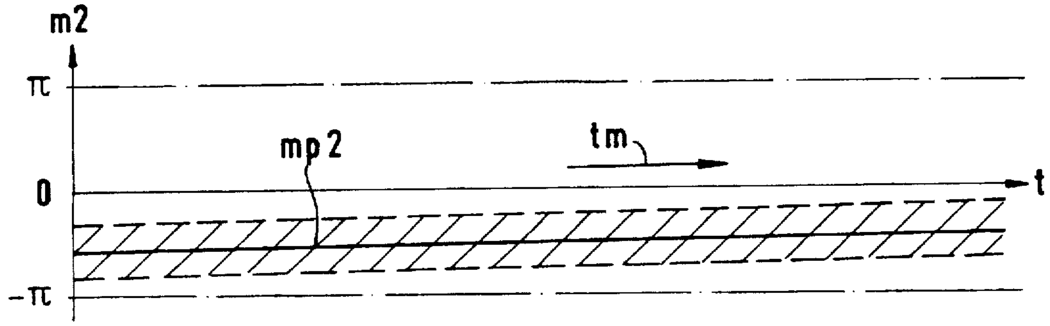
FIG. 3 is a diagram illustrating the variation of the second phase signal with time.

However, the compensation for the mean slope mp does not yet cause the second phase signal p2 to be located exactly at the phase reference value on a time average. The time average tm of the second phase signal p2 is shown in FIG. 3 as a slowly rising straight line below the zero phase reference axis. By means of a second feedback control loop 30, the time average tm of the second phase signal p2 is placed exactly on the zero phase reference axis. This is achieved by means of a second filter device 34 and the integrator 28. The output of the first adder 22 is applied directly or through a modification device 36 to the input of the second filter device 34, whose output is coupled to a further input of the integrator 28. The output signal of the second feedback control loop 30 is a second corrective signal c2, which is additively/subtractively combined with the first phase signal p1 and the first corrective signal c1 to form a third phase signal p3, which, on a time average, has the correct slope and phase. The second phase signal p2, with its average value mp2, provides the input signal for the second feedback control loop 30. The instantaneous deviations of the third phase signal p3 from the zero phase reference position thus correspond to the required difference signal D and the pilot signal P.

A decoder 38 converts the magnitude signal b and the third phase signal p3 into the required components L, R, P of the stereo combination signal. In accordance with the transmission standard, the third phase signal p3 is generally modified by means of the modification device 36, which determines the associated tangent value, for example. As the magnitude signal b contains the carrier amplitude, the third phase signal p3 or the modified phase signal p3' for the stereo matrix in the decoder 38 is normalized to the carrier amplitude. This is done by means of a multiplier 40, whose first and second inputs receive the magnitude signal b and the third phase signal p3 or p3', respectively.

It should be noted that in FIG. 1 the second and third phase signals p2, p3 are identical, because the output of the first and second feedback control loops 20, 30 is formed by the common adder 22. The operation of the demodulator will be more easily understood if p2 and p3 are considered separately.

Figure 2:
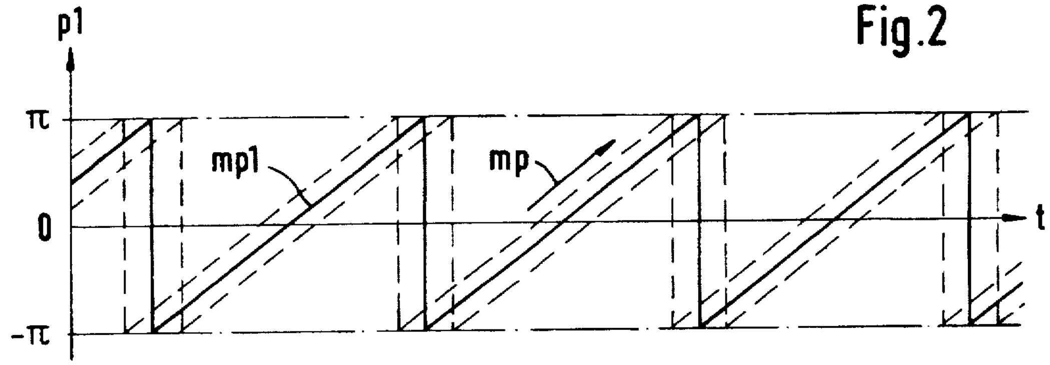
FIG. 2 is a diagram illustrating the variation of the first phase signal with time.

Referring to FIG. 2, a diagram illustrating the variation of the first phase signal p1 with time is shown. A steady increase mp in the mean phase mp1, which is shown by a sawtooth-shaped continuous line, corresponds to the residual rotational frequency $\omega_r$ of the complex vector M(t). The first phase signal p1 is preferably represented as a twos-complement value whose lower and upper limits correspond to the phase angles $-\pi$ and $+\pi$, respectively. The steadily increasing phase mp1 thus suddenly returns from the phase value $+\pi$ to the phase value $-\pi$. The coupling of the respective phase value to the twos complement representation has the big advantage that phase difference values are correctly represented even if the phase has meanwhile overflowed. The range bounded by dashed lines around the mean phase mp1 is the range within which the first phase signal p1 may vary as a result of the modulation with the difference signal D and the pilot signal P.

Referring to FIG. 3, there is shown a diagram illustrating the variation of the second phase signal p2 with time. The second phase signal p2 is obtained by a phase correction with the first feedback control loop 20. The mean phase mp2 has only a very slight slope tm, if any. However, the mean phase mp2 is not located on the zero phase reference axis as required—that only happens by chance. Correction of the zero phase position is performed by the second feedback control loop 30, which also suppresses the slight residual slope tm. The instantaneous phase of the second phase signal p2 lies in the range around the means phase mp2 bounded by dashed lines.

Figure 4:
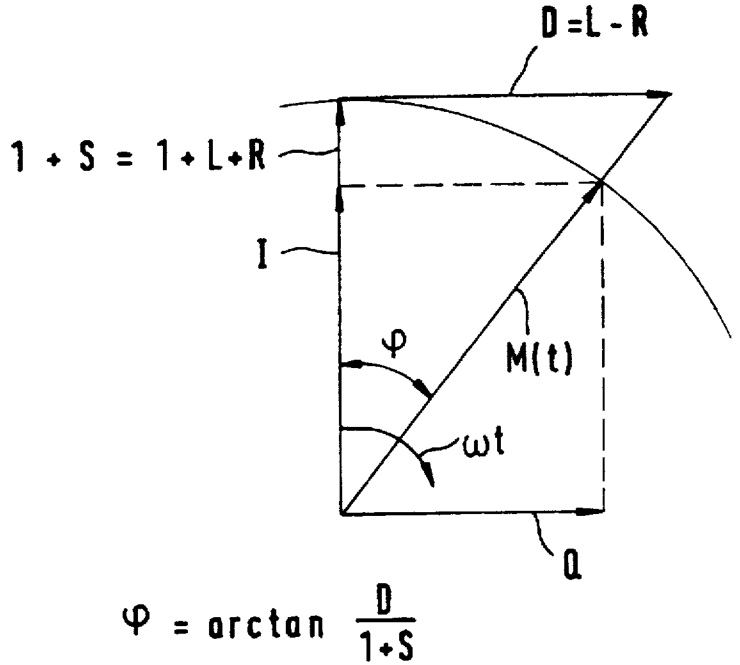
FIG. 4 is a diagram illustrating a few signals in a complex vector.

Referring to FIG. 4, a complex vector diagram is shown which illustrates the modulation vector M(t) rotating at the frequency $\omega$. The modulation components 1+S and D define the instantaneous amplitude and phase $\phi$ of the vector with respect to a reference vector rotating with a constant amplitude and a constant signal. In the case of the quadrature-modulated signal sq, which is transmitted at high frequency, this is the associated carrier. The rotating reference vector determines the reference phase via the in-phase component I. Perpendicular thereto is the quadrature component Q. From these two components I, Q, the resolver determines the instantaneous length 1+S and instantaneous phase $\phi$ of the vector M(t). The vector diagram is independent of the rotational frequency $\omega$. Thus, this representation holds both for the quadrature-modulated signal sq, which is transmitted at high frequency, and for the in-phase and quadrature components I, Q, whose associated reference vector rotates at the low frequency $\omega_r$.

The demodulator according to the invention can be implemented as a program run in a processor, particularly in a monolithic integrated circuit, or as a circuit or in mixed form, it being irrelevant how the individual functional units are implemented in detail and whether the functional units also serve other purposes.

While the invention has been particularly shown and described with reference to preferred embodiments thereof, it will be understood by those skilled in the art that changes in form and details may be made therein without departing from the spirit and scope of the present invention.

What is claimed is:

1. A digital demodulator for a quadrature-modulated signal (sq) which transmits a combination signal by amplitude and phase modulation, said digital demodulator comprising:

a quadrature-signal source which, in response to the received quadrature-modulated signal (sq), provides a digitized in-phase component (I) and a digitized quadrature component (Q) at a low frequency;

a resolver which converts the digitized in-phase component (I) and the digitized quadrature component (Q) into a magnitude signal (b) and a first phase signal (p1);

a first feedback control loop following the resolver which, on a time average, maintains the slope of the first phase signal (p1) at the zero value or a residual value, thereby forming a second phase signal (p2);

a second feedback control loop following the resolver which maintains the time average of the second phase signal (p2) at a phase reference value, particularly at a zero phase value, thereby forming a third phase signal (p3); and a decoder which produces at least one digitized component (R,L,P) of the combination signal from the magnitude signal (b) and the third phase signal (p3).

2. The demodulator of claim 1, wherein the slope (mp) of the first phase signal (p1) is formed from the difference between at least two temporally adjacent sample values.

3. The demodulator of claim 1, wherein the first feedback control loop forms a first corrective signal (c1) with which the first phase signal (p1) is changed in value.

4. The demodulator of claim 3, wherein the first feedback control loop further forms a second corrective signal (c2) with which the first phase signal (p1) is changed in value.

5. The demodulator of claim 1, wherein the second feedback control loop forms a first corrective signal (c1) with which the first phase signal (p1) is changed in value.

6. The demodulator of claim 5, wherein the second feedback control loop further forms a second corrective signal (c2) with which the first phase signal (p1) is changed in value.

7. The demodulator of claim 1, which further includes an integrator that is common to the first and second feedback control loops.

8. The demodulator of claim 1, wherein the third phase signal (p3) is applied to the decoder through a modification device.

9. The demodulator of claim 1, wherein the third phase signal (p3) is applied to the second feedback control loop through a modification device.

10. The demodulator of claim 9, wherein the modification device is a tangent-forming device.

11. The demodulator of claim 9, which further includes a multiplier coupled between the modification device and decoder for normalizing the third phase signal (p3) to a carrier amplitude included in the magnitude signal (b).

12. The demodulator of claim 1, wherein the first feedback control loop includes a difference device and a first filter device.

13. The demodulator of claim 1, wherein the second feedback control loop includes a second filter device.

14. A method for digitally demodulating a quadrature-modulated signal (sq) which produces a combination signal by amplitude and phase modulation, said method comprising the steps of:

providing a digitized in-phase component (I) and a digitized quadrature component (Q) at a low frequency;

converting the digitized in-phase component (I) and the digitized quadrature component (Q) into a magnitude signal (b) and a first phase signal (p1);

maintaining the slope of the first phase signal (p1) at the zero value or a residual value, thereby forming a second phase signal (p2);

maintaining the time average of the second phase signal (p2) at a phase reference value, particularly at a zero phase value, thereby forming a third phase signal (p3); and producing at least one digitized component (R,L,P) of the combination signal from the magnitude signal (b) and the third phase signal (p3).

15. The method of claim 14, wherein the slope (mp) of the first phase signal (p1) is formed from the difference between at least two temporally adjacent sample values.

16. The method of claim 14, wherein the step of maintaining the slope of the first phase signal (p1) at the zero value is accomplished by a first feedback control loop that forms a first corrective signal (c1) with which the first phase signal (p1) is changed in value.

17. The method of claim 16, wherein the step of maintaining the time average of the second phase signal (p2) is accomplished by a second feedback control loop that forms a first corrective signal (c1) with which the first phase signal (p1) is changed in value.

18. The method of claim 17, which further includes an integrator that is common to the first and second feedback control loops.

19. The method of claim 14, which further includes modifying the third phase signal (p3) by determining the associated tangent values.

20. The method of claim 19, which further includes multiplying the modified phase signal (p3') by the magnitude signal (b).

* * * * *